3,479,191
METHOD FOR COATING DEHYDRATED FOOD
Morton S. Cole, Minneapolis, Minn., assignor to Archer Daniels Midland Company, Minneapolis, Minn., a corporation of Delaware
No Drawing. Filed July 30, 1965, Ser. No. 476,174
Int. Cl. A23b 1/10, 7/16
U.S. Cl. 99—166                                                    8 Claims

ABSTRACT OF THE DISCLOSURE

A method for protecting food products, and particularly dehydrated food products, against oxidative degradation, mold attack and moisture penetration, which comprises coating said food products with separate layers of an amylose ester of a fatty acid having from 12 to 26 carbon atoms, said amylose having at least 70% of the available hydroxyl groups esterified, and a fusible protein.

DISCLOSURE

The present invention relates to edible coating compositions and to methods for coating food therewith.

Although the coating of food to protect such food against oxidative degradation, mold attack, and moisture penetration is well known, most coatings employed for these purposes are not edible and must be removed before the food can be consumed. A particular problem of food protection exists with respect to dehydrated foods such as obtained by the well-known freeze drying processes; not only is it desirable to obtain edible food coatings, which protect aaginst oxidative degradation, mold attack, and moisture penetration on such food products; but, it is furthermore necessary that the coatings do not significantly interfere with the rehydration of the food product.

It is, therefore, an object of the present invention to provide an edible food coating.

It is another object of the present invention to provide an edible food coating of particular value in dehydrated food products.

It is a further object of the present invention to provide an edible food coating which protects food products against moisture penetration, oxidative degradation, and mold attack.

Still another object of the present invention is to provide a method of coating food products to improve their storage life.

Still a further object of the present invention is to provide a method of preventing fragmentation of food products.

Other objects of the present invention will become apparent from the following description and claims.

The edible coating of the present invention comprises a laminate of an amylose ester of a fatty acid having from 12 to 26 carbon atoms, wherein the amylose has at least 70% of the available hydroxyl group esterified, and a fusible protein.

The coating of food with a protein, such as gelatin, is known to impart protection against oxidative degradation. However, proteins not only have poor thermoplastic properties making their application as a continuous film difficult, but furthermore result in brittle films that break readily when subjected to stress. Additionally, protein coatings do not adhere well to non-polar food products thereby increasing the probability of cracking. The application of protein to freeze dried food products constitutes a particularly vexing problem since protein coatings are generally applied in the form of aqueous dispersions or solutions, which, when employed in the coating of dehydrated food products, adversely affect the dehydrated nature of the product.

The present invention in which an amylose fatty ester is employed as one component of the coating laminate and the protein is employed as the second component of the coating laminate achieves a number of desirable features. Thus, it was found that the amylose fatty esters not only are outstanding moisture barriers but also that they permit the use of aqueous protein dispersions and solutions to coat dehydrated foods without destroying the dehydrated nature of the food product. Furthermore, amylose fatty esters were found to be outstanding thermoplastic materials which can be readily applied to food products to give rise to continuous films of sufficient toughness and flexibility. This is of particular significance in reducing the fragmentation of food products. Additionally the amylose esters were found to adhere well to almost any type of food product and also result in good adhesion of protein films to the amylose fatty ester film and therefore to the food product.

The proteins employed in the coated laminate of the present invention include any high molecular weight, i.e., greater than 10,000, amino-acid polymer that can be cast into films. The protein coating can be formed from the amino-acid itself or from the metal salt or proteinate. The term protein as used herein is intended to include both of these forms. The protein employed must be either soluble in water or an organic solvent or dispersible in water or such solvent to form water or solvent containing gel particles which when applied to a surface and dried form a continuous coating. The ability of any particular protein to be cast into films from solutions or dispersions is well known in the art and is referred to herein as "fusible." Fusible proteins suitable for forming the edible cotaing laminates of the present invention include proteins and proteinates derived from vegetable and animal sources such as soy protein and proteinates, casein, zein, gelatin, and the like. The protein employed in the formation of the coatings as described herein need not be pure but can contain minor proportions of inert ingredients.

Although water generally acts as a plasticizer for the protein, thus increasing its fusibility, other plasticizers and particularly non-toxic alcohols and polyols such as ethanol, ethylene glycol, propylene glycol, glycerol, and similar liquid polyols having from two to six carbon atoms, can be employed as plasticizers for the protein in place of the water or in combination with water. Generally the concentration of such polyol plasticizer does not exceed 30% by weight of the plasticized composition.

The amylose fatty esters employed in the coating compositions of the present invention are esters of fatty acids having from 12 to 26 carbon atoms and amylose, the linear fraction of starch, which is separable from the branched fraction of starch, amylopectin, by known methods. The repeating glucose units of the amylose contain three hydroxyl groups which can be esterified by esterification methods heretofore employed for polyols and fatty acids. Amylose fatty esters which have the desirable film and barrier forming properties described hereinabove are obtained when greater than 70% of these available hydroxyl groups are esterified. Preferably amylose fatty acid esters are employed in which between 80% and 100% of the available hydroxyl groups of the amylose are esterified. The preferred fatty acids employed are saturated fatty acids in view of their greater stability to oxidation such as stearic acid, lauric acid, palmitic acid, and myristic acid. Unsaturated fatty acids such as oleic acid, however, are not excluded from the scope of the present invention. The amylose esters can contain more than one fatty acid radical such as is obtained when the amylose is esterified with a mixture of acids. Similarly mixtures of different amylose fatty esters can be employed.

The protein-amylose ester laminates can be formed by various coating methods. Each of the coatings is generally applied separately from a dispersion or solution of the composition. Although it is possible to employ melts of the amylose esters, it is generally preferred to employ such in the form of a dispersion or solution in a volatile solvent such as a readily volatile liquid hydrocarbon, e.g., hexane. The food product to be coated is sprayed or brushed with or dipped into the dispersion of the amylose ester, the volatile solvent is evaporated and the coated food product is subjected to a hot gas stream to assure the formation of a continuous fused coating. After the amylose ester coating has been formed, the protein coating is applied by employing the above-described techniques of dipping, spraying, and brushing. The resulting coating is air dried. Whlie it is preferred to obtain the coating on the food product by methods involving the in situ formation of each component of the laminate, it is to be understood that preformed laminated films can also be employed to protect the food product and improve its storage life. Preformed laminates and films can be prepared by casting techniques and melt drawing techniques employing solutions, dispersion or hot melts of the components. The order in which the components of the laminate are coated onto the food product is not critical and will depend primarily on the food product to be coated. Thus, the above-described procedure can be reversed. In the coating of dehydrated food products it is generally preferred to employ the amylose esters as the primary coating.

The thickness of each coating component can be varied widely, although generally coating thicknesses, which result in a weight increase of more than 20% of the food product coated, are not preferred. The optimum coating thickness will differ with the particular food product coated, the degree of protection desired and the storage environment involved. In general each coating component should have sufficient thickness to assure a continuous coating and give the desired degree of protection. The thickness of a coating can be readily controlled to any desired thickness by employing more dilute solutions or dispersions to obtain thinner coatings or by repeating the coating application to obtain heavier coatings.

The present invention furthermore is not limited to a two component laminate of the amylose ester and the protein. Thus, additional alternate layers of the amylose ester and the protein can be applied. In some applications, additional layers of the laminate components can be of particular utility. Since water is frequently used as a plasticizer for the protein, exposure of the coated food product to a dry environment can cause rapid evaporation of the water from the protein coating, thereby causing the protein coating to become brittle and subject to breaking when subjected to stress. The loss of plasticizer can be significantly reduced by applying an additional coating of the amylose ester over the protein.

Although the coating composition of the present invention is of particular utility in the coating of dehydrated food products, such as dehydrated meats, vegetables, and fruits to improve the storage life of such, it is also useful in the coating of frozen foods such as frozen meats and vegetables as well as unmodified, i.e., raw or fresh, food products to improve the storage life of such products.

The improvement in storage life of the food products, by the coating composition of the present invention, can be further enhanced with respect to the growth of microorganisms by the addition of a suitable preservative to the coating composition. Such preservatives include sorbic acid, potassium sorbate, methyl p-hydroxybenzoate, sodium benzoate, sodium propionate, and propyl p-hydroxybenzoate. The addition of even small concentrations of such preservatives results in a marked improvement in reducing or preventing the growth of microorganisms. Adequate protection against the growth of microorganisms is obtained if the concentration of the preservative in the coating constitutes about 0.01 to 0.2% by weight of the coated food product.

The invention is further illustrated by the following examples, in which all units of quantity are by weight unless otherwise indicated.

Example I

Freeze dried peas were dipped into a 6% hexane dispersion of amylose myristate, having between 80% and 90% of the available hydroxyl groups esterified. After heating the coated peas with a heat gun to a temperature above the boiling point of the hexane solvent, the coated peas were placed in a sieve and sprayed with a 20% aqueous dispersion of Promine D, a commercially available soy proteinate, employing a pneumatic atomizing nozzle and a De Vilbiss pressure pot of one quart capacity. The freeze dried peas were agitated in the sieve to allow complete coating of the surfaces of the peas. A hot air stream was directed into the sieve simultaneously with the proteinate spray to aid in the removal of excess water. The amylose myristate coating increased the weight of the freeze dried peas by about 6% and the coating of both the amylose ester and the proteinate increased the weight of the food product by about 14%. The coated freeze dried peas together with uncoated freeze dried peas were stored for a period of one month at 80° to 90° F. at relative humidities in excess of 70%. The uncoated peas showed a weight increase of 2.4% as compared to 0.8% for the coated product. The coated product could be rehydrated substantially to the extent of the uncoated product.

Example II

The procedure of Example I was repeated employing freeze dried chicken pieces, except that each piece was sprayed separately with the proteinate dispersion. On storage for one month at 20° to 30° F. and greater than 70% relative humidity, the coated product showed a moisture gain of 3.68% as compared to 9.32% for the uncoated product.

Example III

The procedure of Example I is repeated employing freeze dried sliced carrots and a 6% dispersion of amylose laurate instead of the freeze dried peas and the amylose myristate dispersion. Similar improvements in storage life are obtained.

Example IV

Air dried apple slices are coated with a 6% solution of amylose myristate by dipping as described in Example I. The coated slices were then brushed with a 20% aqueous dispersion of Type A 300 Bloom gelatin. The coated apple slices are then air dried in a warm air stream. Similar storage results as shown in Example I are obtained.

Example V

The procedure of Example I is employed using a sodium caseinate dispersion in 50% aqueous ethanol instead of the soy proteinate. A continuous laminate of the amylose myristate and the sodium caseinate is obtained.

Example VI

The procedure of Example I is employed using a zein dispersion in propylene glycol instead of the soy proteinate. A continuous coating of the amylose myristate and the zein is obtained.

The foregoing examples illustrate the formation of the edible coating laminates of the present invention and demonstrate that a wide variety of proteins, amylose esters, and coating methods can be employed to accomplish the desirable edible coatings. It will be apparent that the described coating methods are applicable to other proteins as well as other amylose esters coming within the scope of the invention as defined hereinabove, but not specifically described in the examples. Other suitable coating techniques will be apparent to those skilled in the

What is claimed is:

1. A method for protecting a dehydrated food product, which comprises the steps of contacting said food product with a dispersion of an amylose ester of a fatty acid having from 12 to 26 carbon atoms, said amylose having from 80% to 100% of the available hydroxyl groups esterified, in a volatile organic solvent, removing the solvent and thereafter contacting the resulting coated food product with an aqueous dispersion of a fusible protein and drying the resulting protein coating.

2. The method of claim 1 wherein the organic solvent is a hydrocarbon solvent.

3. The method of claim 1 wherein the protein dispersion is a gelatin dispersion.

4. The method of claim 1 wherein the fatty acid is a saturated acid.

5. The method of claim 1 wherein the protein is a soy proteinate.

6. The method of claim 1 wherein the fatty acid is myristic acid.

7. The method of claim 1 wherein the fatty acid is lauric acid.

8. The method of claim 1 wherein said coated laminate constitutes from 1% to 20% by weight of the food product.

References Cited

UNITED STATES PATENTS

| | | | |
|---|---|---|---|
| 2,766,143 | 10/1956 | Novak et al. | 117—167 X |
| 2,811,453 | 10/1957 | Childs | 99—169 |

OTHER REFERENCES

Gros et al.: Properties of Fatty Acid Esters of Amylose, Journal of the American Oil Chemists' Society, January 1962 issue, vol. 39, No. 1, pp. 19–24.

A. LOUIS MONACELL, Primary Examiner

STEPHEN B. DAVIS, Assistant Examiner

U.S. Cl. X.R.

99—168, 169; 106—210; 117—165, 167